C. E. MILLER.
TIRE CASING.
APPLICATION FILED MAR. 17, 1921.

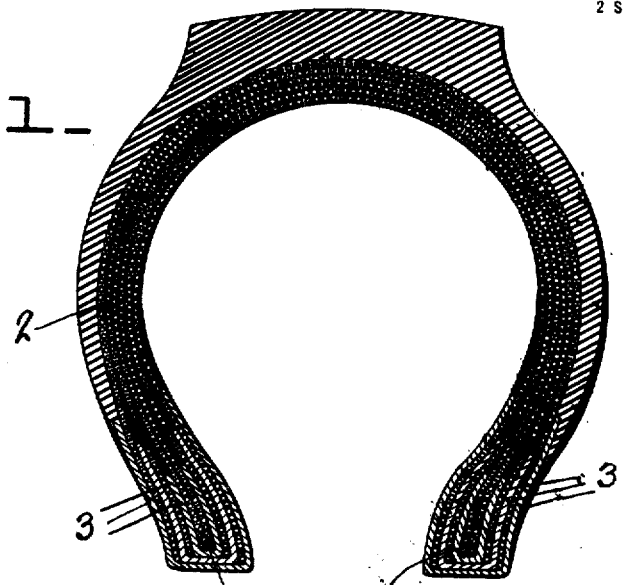
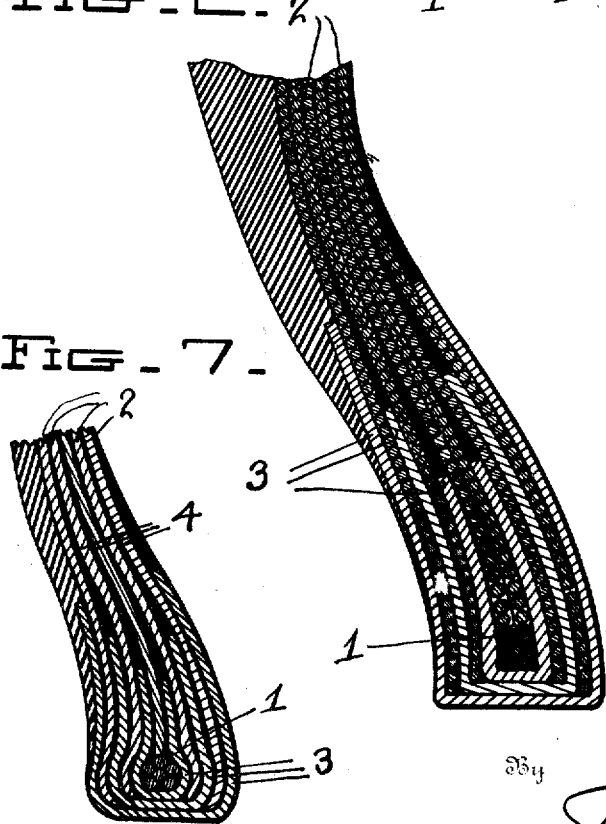
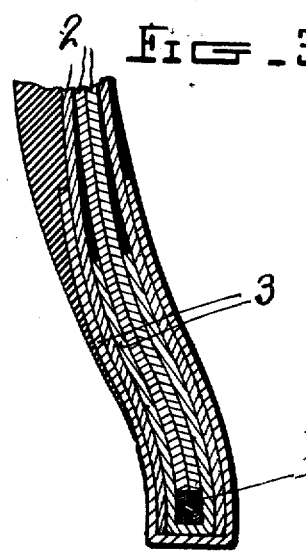
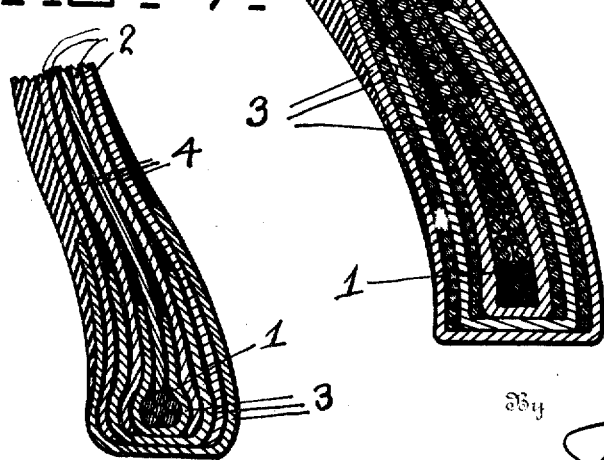

1,393,952.

Patented Oct. 18, 1921.
2 SHEETS—SHEET 2.

Inventor
Charles E. Miller

By
Attorney

UNITED STATES PATENT OFFICE.

CHARLES E. MILLER, OF ANDERSON, INDIANA.

TIRE-CASING.

1,393,952.    Specification of Letters Patent.    Patented Oct. 18, 1921.

Application filed March 17, 1921. Serial No. 453,025.

*To all whom it may concern:*

Be it known that I, CHARLES E. MILLER, a citizen of the United States, residing at Anderson, in the county of Madison and State of Indiana, have invented certain new and useful Improvements in Tire-Casings, of which the following is a specification.

This invention relates to tire casings and it consists in the novel features hereinafter described and claimed.

An object of this invention is to provide a new improved system of bead and side wall structure for making tire casings. The said system is especially adapted for the manufacture of cord tires, different layers of cord material come to the bead line built between plies of tire fabric which is extended around the bead wires instead of running the cord materials around same. Outside and inside plies of fabric and cord alternate all the way through the side wall immediately above the bead at different widths.

Another object of this invention is to provide a tire casing new and improved in construction which has extra strength at the side wall and bead, this being especially adapted for making cord tires without running the cord material around the bead, but anchoring each ply of cord doubly with relation to the bead. This system is known as the double anchored system. This anchoring makes it natural that each cord carries its individual proportionate share of the load to which it is subjected and by this structure each cord is fastened to the bead line securely giving the maximum flexibility. The bead and side wall structure may be made of rubberized building tire fabric or similar material, properly prepared as will be described hereinafter.

A further object of the invention is to provide a tire casing in the structure of which is used plies of cord, bead members, strips of fabric materials and an elastic binding means, the parts being so arranged and assembled that the construction basis of cord lie between the strips of fabric material and the plies of fabric pass around the bead members. The plies of cord are originally in tubular form and are nested one within the other. The strips of fabric material are disposed between the plies of cord material at uneven, irregular widths, and extend around the bead members. Between the bead members the plies are brought together in close contact and are bound by a rubber or elastic or cementing agent. The strands of cord material are disposed diagonally with relation to the crossed strands of the fabric material to add strength to the structure, although fabric material can be used cut on the bias with the same success as hereinafter described and claimed. By this structural arrangement each strand of cord passes down to rim line of bead members and is securely fastened thereto, thereby preventing the cutting of the cord and overcoming uneven tension at or about the bead members. Each cord or strand or thread carries its proportionate share of the strain or load to which it is subjected when the tire casing is in or out of service.

In the accompanying drawings:—

Figure 1 is a transverse sectional view of a tire casing embodying the invention and in which wire bead members may be used.

Fig. 2 is an enlarged transverse sectional view of the side wall and bead of a tire casing shown in Fig. 1.

Fig. 3 is a transverse sectional view of the tire casing embodying the invention and in which bead members may be triangular, square, rectangular, oval or any angular shape.

Fig. 7 is a transverse sectional view of a tire casing embodying the invention and in which wire bead members are used showing side wall and bead of a tire casing composed of rubberized cord or similar material and rubberized fabric or similar material which has its anchoring to the beads by various plies or layers of rubberized fabric or similar material which extend between layers of rubberized cord or similar material cut to various widths, so as to have a blended reinforced effect, all vulcanized into a homogeneous mass.

Figure 4:
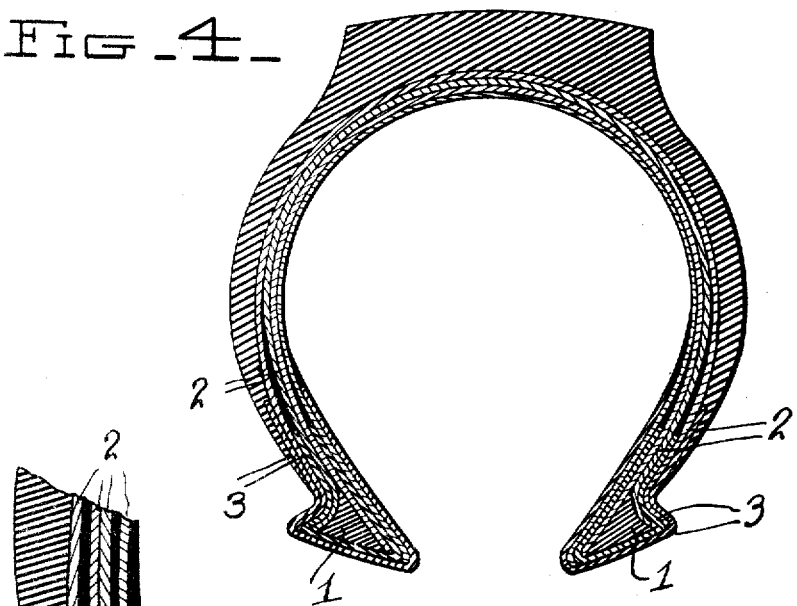
Fig. 4 is an enlarged sectional view of a side portion of the oval or angular beaded type.
Figure 5:
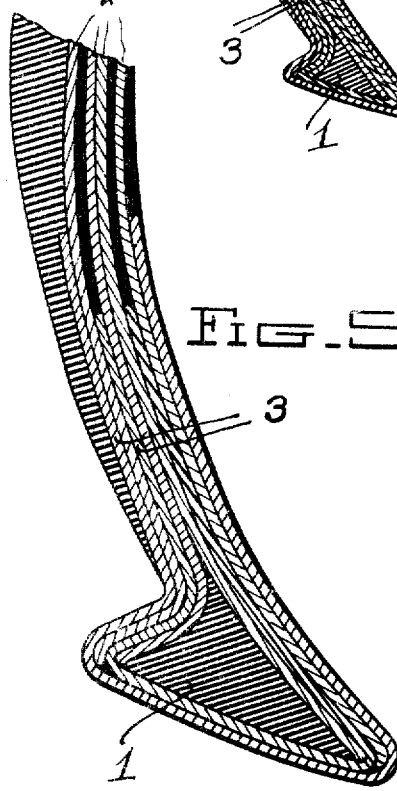
Fig. 5 is a similar view of an edged portion of side wall and bead shown in Fig. 4.
Figure 6:
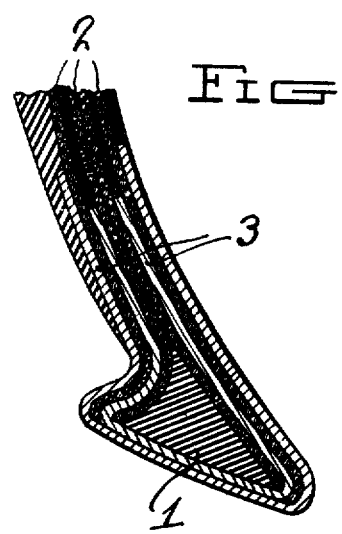
Fig. 6 is the same detailed view of the oval or angular type of side wall and bead shown in Figs. 4 and 5.

As illustrated in the accompanying drawings the tire casing comprises a body or carcass consisting of bead members 1 (one) which may be composed of hardened rubber, oval or angular shaped, or similar material together with fabric, oval or angular shaped, in cross section as shown in Figs. 4, 5 and 6 or which may be composed of wire strands as shown in Figs. 1, 3, 2, 7. Figs. 4, 5 and 6 as illustrated represent what is commonly known as the clencher type of tire casing. Figs. 1, 2, 3 and 7 as illustrated represent that which is commonly known as the straight side beaded type of tire casing.

Tubular plies 2 (two) of rubberized cord or similar material are nested one within the other and the bead members are received within plies of cord. The strands of rubberized cord are spirally disposed and are held together by a suitable cementing means. Strips of rubberized fabric or similar material 3 (three) are interposed between the plies of rubberized cord and may be applied to the exterior or interior surface of any and all plies of cord material. These strips of rubberized fabric or similar material extend around the bead members and their edged portions are disposed along the intermediate portion of the casing body extending between layers of rubberized cord or similar material cut to various widths so as to have a blended reinforced effect. The innermost strip of fabric material may be narrower than the other strips and the strips increase successively in transverse breadth from the inner strip to the outer strip of the set of strips. Around the bead members and between them the plies of various materials are pressed in close contact with each other and held together by rubber or similar material 4 (four) shown in Figs. 1, 2, 3, 4, 5, 6 and 7 or other cementing means. The strands of cord are diagonally disposed with relation to the crossed strands of which the strips of fabric are composed.

In old systems common in use at this time for making cord tires the cord material is built clear around the bead and up on the opposite side or fastened around hooks, bead wires or similar means of holding the bead at a stationary diameter. With the use of this old system there exists a great amount of bead, side wall, rim cutting and other troubles. This is caused largely on account of the hooks, bead wires or other means of fastening cord which extend around the bead being in close contact with the cords. Some of the plies of cord material are trimmed at bead and all the layers do not go around the bead or means of fastening and accordingly it would follow that the plies of cord material that extend around the bead must carry more than their proportionate share of the strain. With this old system the cords nearest the hard rubber bead, bead wires or hooks or similar means of holding are frequently the first to be cut or broken, due to the uneven tension and irregular means of fastening, also to the unequal flexibility of the various plies of cord in the tire casing.

Another disadvantage is that with the old system plies of cord which do not go around the bead are trimmed above the bead, and accordingly, the side walls are not reinforced. A still further disadvantage of the old system of making cord tires is that they are more difficult to repair, due to the means and system of fastening about bead members. With the old system uneven tension on cords especially clencher type of tire casing, which must be built to stretch slightly about the bead, causes loose side walls, separations, rim cuts, loose treads, broken cords and other troubles.

By the improved tire casing herein illustrated and described a new system of bead and side wall structure is embodied where different layers of cord come to the bead line, vulcanized between tire fabric, at irregular widths which is extended around the bead wires instead of running the cord around same. Outside and inside plies of fabric and cord alternate through the side wall construction of either clencher or straight side type of tire casing. By this system of construction each cord has an individual fastening to bead members securely and the cutting of the cords by the bead wires or holding means or uneven tension at the bead is overcome practically eliminating the possibility of rim cut. By this improved tire casing a much stronger and firmer bead and side wall is the result, also, makes cord tires more simple to repair as well as more simple for the manufacturer of clencher, straight side and other types of beads; besides, added flexibility which causes a more secure means of holding cord material so that the result is equal flexibility of each cord or thread at the bead line without being cut or strained by holding means; added flexibility will cause easier riding, farther coasting and save gasolene.

By this arrangement herein described, the new tire casing is so constructed that every strand of cord is securely attached to the bead members. This anchoring of the strands of cord causes each thread to carry its proportionate share of the load or strain to which it is subjected. The structure provides a strong, firm bead and side wall for the casing. The structure may be quickly built into casings of the clencher, straight wall, straight side and other types of beads. The additional strength to the side walls of tire casing prevents rim cutting when reasonable amount of air pressure is maintained in the tire. It is more simple and easier to repair. The tire casing possesses more flexibility at the bead line without strain at cord. The added flexibility causes easy riding, farther coasting and effects a saving in gasolene or fuel. Hence, it will be seen that an improved and simplified, new and original system, for making a tire casing especially adapted for cord construction is provided.

Having described the invention what is claimed is:—

1. A tire casing comprising a body composed of bead members, tubular laminæ of cord, nested one within the other and receiving the bead members, strips of fabric material interposed between the laminæ of cord and strips of fabric material applied to exterior and interior surfaces of the inner and outer layer of laminæ of cord. The said fabric strips passing around the beads, the plies of cord materials and the edged portions of the strips of fabric being brought together and lying in close contact with each other between the bead members, and an elastic binding means cementing the plies of material and the bead members together in the form of a casing carcass which is vulcanized under pressure, producing an inseparable, homogeneous mass.

2. A tire casing composed of bead members, tubular laminæ of cord nested one within the other and receiving the bead members, strips of fabric material interposed between the laminæ of cord and strips of fabric material applied to exterior and interior surfaces of the inner and outer laminæ of cord, the said fabric strips passing around the beads, the said fabric strips being of different transverse breadths, the plies of cord materials and the edged portions of the strips of fabric being brought together and lying in close contact with each other between the bead members and an elastic binder cementing the plies of material and the bead members together in the form of a casing carcass.

3. A tire casing comprising a body composed of bead members, tubular laminæ of cord nested one within the other and receiving the bead members, strips of fabric interposed between the laminæ of cord and strips of fabric material applied to exterior and interior surfaces of inner and outer layers of laminæ of cord, the said fabric strips passing around the bead members, the said fabric strips being of different, transverse breadths embodying an individual fastening to bead members securely making it natural that each thread carries its individual proportionate share of the strain and providing a simpler means of making or repairing the bead members together in the form of a casing carcass.

4. A tire casing comprising a body composed of bead members, tubular laminæ of cord nested one within the other and receiving the bead members, strips of fabric material interposed between the laminæ of cord and one strip of fabric material applied to the exterior surface of the outer laminæ of cord, the strands of the cord material being disposed diagonally with relation to the crossed strands of the fabric material, the said fabric strips passing around the beads, the plies of the cord material and the edge portions of the strips of fabric being brought together and lying in close contact with each other between the bead members and an elastic binder cementing the plies of material and the bead members together in the form of a casing carcass.

In testimony whereof I affix my signature.

CHARLES E. MILLER.